United States Patent
Otto

[15] 3,660,172
[45] May 2, 1972

[54] PREPAINT TREATMENT FOR ZINCIFEROUS SURFACES

[72] Inventor: George Freed Otto, Oreland, Pa.
[73] Assignee: Amchem Products, Inc., Ambler, Pa.
[22] Filed: Aug. 19, 1970
[21] Appl. No.: 65,071

[52] U.S. Cl. ............................................................148/6.2
[51] Int. Cl. .......................................................C23f 7/26
[58] Field of Search ...............................148/6.2, 6.21, 6.16

[56] References Cited

UNITED STATES PATENTS

| | | |
|---|---|---|
| 3,397,091 | 8/1968 | Russell...................................148/6.2 |
| 3,404,044 | 10/1968 | Russell...................................148/6.2 |
| 2,727,841 | 12/1955 | Chester..................................148/6.2 |

Primary Examiner—Ralph S. Kendall
Attorney—Ernest G. Szoke

[57] ABSTRACT

A conversion coating is applied to zinciferous surfaces, thereby enhancing the corrosion resistance and bonding properties of the substrate when a paint or similar siccative organic finish is thereafter applied.

3 Claims, 1 Drawing Figure

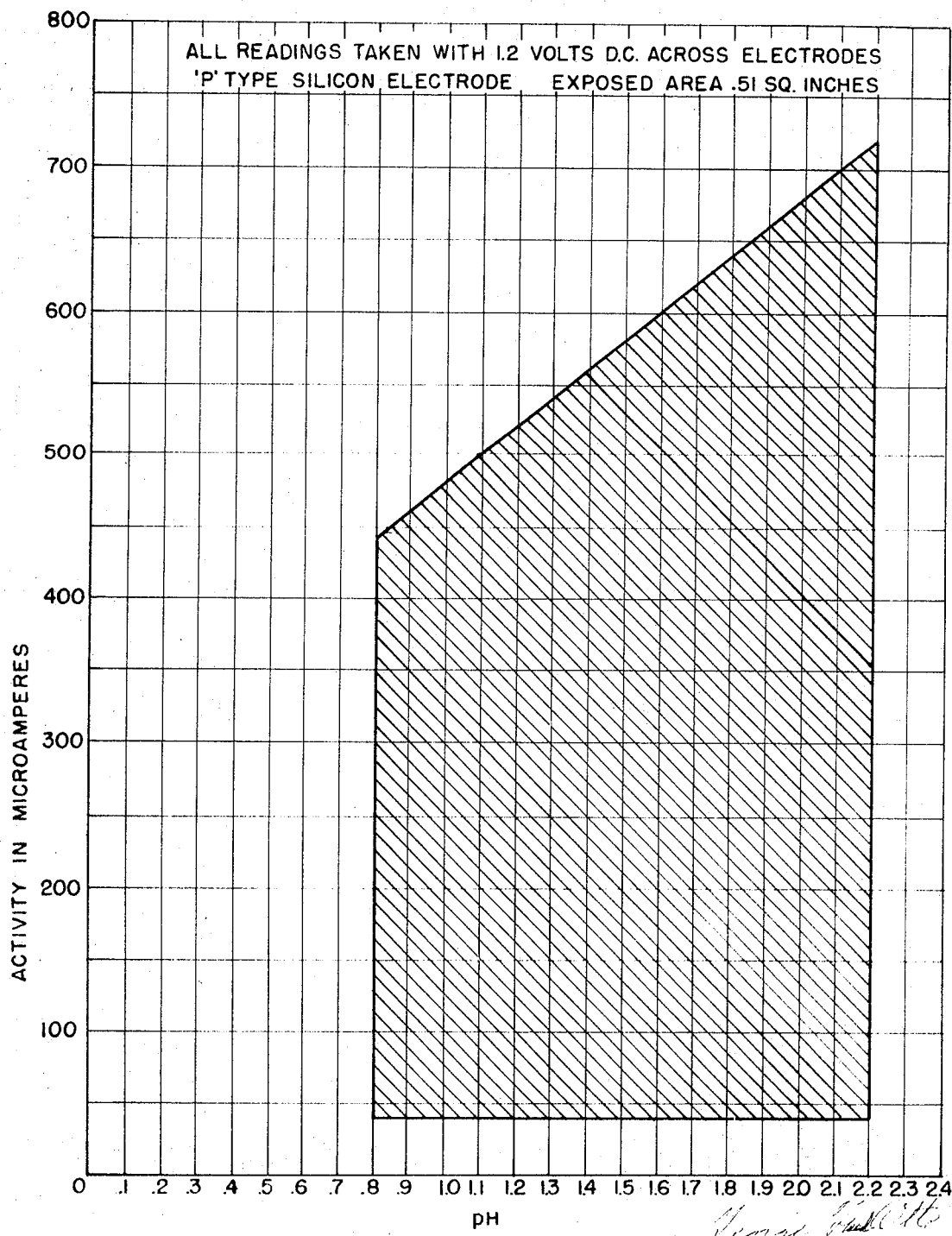

PREPAINT TREATMENT FOR ZINCIFEROUS SURFACES

BACKGROUND OF THE INVENTION

The attainment of a corrosion resistant coating which at the same time enhances paint adhesion on a zinciferous surface is desirable, in order to prolong the life of the substrate and increase the effectiveness of the paint film. When utilized herein, the term "zinciferous" means zinc and zinc alloys in which zinc is the principal constituent, as well as galvanized surfaces, including both hot-dipped and electrogalvanized surfaces.

Processes for treating zinc employing solutions containing chromate and processes forming chromate conversion coatings on zinc surfaces are well known in the art. Such treatments and processes are disclosed, for example, in U.S. Pat. Nos. 2,494,908; 2,727,841; and 3,130,085. Treatments of like kind are employed in the bright dipping or polishing process art, as disclosed in U.S. Pat. Nos. 2,904,413 and 3,060,071.

The known practices of the art to which reference has been made often result in non-uniform coatings and both poor corrosion resistance and poor paint adhesion especially where the solutions have been employed in high speed coating operations. Some treating solutions employed in the prior art contain concentrations of chromate which are too low to inhibit the acid attack on the zinc surface or do not contain sufficient concentrations of active fluoride to attack resistant film impurities, thereby causing the resultant chromate coatings to be of insufficient thickness to give beneficial corrosion resistance as well as acceptable paint bonding qualities.

The present invention has enabled me to attain a chromate conversion coating possessing both satisfactory paint bonding properties while maintaining optimum corrosion resistance.

Galvanized surfaces contain resistant film impurities which a coating bath must attack before a continuous, amorphous coating can be formed over the substrate. Present practices in the art do not provide a coating bath which sufficiently and uniformly attacks these impurities, so that after a siccative finish or paint is applied, poor adhesion results due to the lack of a tight uniform bond between the underlying chromate coating and zinc base metal.

I have found that active fluoride is the constituent which is responsible for such attack on the impurity film, i.e. the galvanized surface containing resistant film impurities. The active fluoride also aids the hydrogen ion or acid attack on the zinc surface and acts as an accelerator for this attack. The term "active flouride" means fluoride present in the operating bath which, at a given pH, will exhibit activity measured as current passing through the operating solution measured by an electrolytic cell having two electrodes, one of which is composed of p-type silicon where a voltage is placed across the electrodes.

Present day processes and coating baths do not possess or allow for a source of active fluoride in sufficient quantities to attack the impurity film as well as accelerate the acid attack. The hydrolysis of complex fluorides, which are found in some present-day chromate baths, is not substantial enough to "liberate" the required active fluoride due to the low concentrations of complex fluoride in these operating baths. It has not heretofore been recognized in the art that in order to promote the unique film impurity attack, sufficient quantitiies of active fluoride are necessary. Sources of active fluoride, such as aqueous hydrofluoric acid, have been specifically avoided and are not preferred in the art.

It is an object of this invention to provide a coating solution for zinc surfaces which contains sufficient quantities of active fluoride to permit attack and removal of the impurities on the zinc surface, thereby allowing a tight uniform chromate coating to be deposited on the substrate.

An object of this invention is to provide a process for forming chromate coatings on zinciferous surfaces which can be employed in high speed commercial operations and which, at the same time, provide good paint bonding properties and corrosion resistance.

It is an added object of this invention to produce uniform coatings where the coating solution is employed continuously in the treatment of a long succession of zinc surfaces in short periods of time.

A concommitant object of this invention is to provide a coating process which results in very little, if any, sludge in an operating coating bath.

Yet another object of this invention is to provide a coating process for zinc surfaces where the coating solution can be applied for long periods of time, or allows for long spray times, without too heavy a chromate coating resulting. The long contact times are beneficial when the coating solution is employed on a formed part.

DETAILED DESCRIPTION

I have discovered a process for the deposition of a paint bonding and corrosion resistant chromate coating on a zinc surface comprising treating the surface with an aqueous acidic solution consisting essentially of chromic acid in an amount from about 3 g/l to about 20 g/l, hydrofluoric acid in an amount from about 0.3 g/l to about 1.5 g/l, and a strong acid selected from the group consisting of nitric, acetic or fluosilicic acid in an amount sufficient to adjust the pH of the resulting solution from about 0.8 to about 2.2.

Active fluoride is employed in the coating bath to maximize the attack of the solution on the film impurities found on the metal surface, to accelerate the hydrogen ion attack and, as a result of its attack on the impurity film, to improve wetting and contact of the coating solution with the metal surface. The resistant film impurities, for example aluminum oxide on a hot-dipped galvanized surface, must be attacked by the active fluoride prior to formation of a continuous coating on the substrate. This attack furnishes the basis for a uniform coating to be deposited and allows for maximum paint bonding qualities. I have found that by employing preferred amounts of hydrofluoric acid, resulting in the presence of sufficient active fluoride, the impurity film will be vigorously attacked but the solution will not attack the underlying zinc surface as aggressively.

Hydrofluoric acid should be added to an operating bath so that a minimum concentration of 0.3 g/l of the acid is present during the coating of the zinc surface. Should the active fluoride be depleted in the coating solution, it must be replenished by addition of hydrofluoric acid so that the acid is present in an amount above the minimum concentration specified.

The amount of fluoride present or to be added to an operating bath is that amount which at a given pH, will exhibit fluoride activity within specified boundaries as measured by a p-type silicon electrode according to the method disclosed in U.S. Pat. Nos. 3,329,587 and 3,350,284 which are incorporated herein by reference.

For the process of the present invention to be effected, the fluoride activity of the coating solution, at a particular pH, must be within the specified range illustrated in the drawing. The activity is measured in microamperes and is measured by an electrolytic cell containing coating solution at ambient temperature and two electrodes, one of which is composed of p-type silicon. The voltage placed across anode and inert platinum cathode is maintained constant at 1.2 volts DC and the p-type silicon anode positioned in the cell has a constant exposed area of 0.51 in.$^2$. When fluoride activity, at a given operating solution pH, is below or above the boundaries illustrated in the drawing, I have found that the coating process cannot be effected satisfactorily.

The drawing is a graph depicting the current (measured in microamperes) passing between anode and cathode as a function of pH. For a particular pH, within the range at which the process of the present invention can be operated, the fluoride activity (measured in microamperes) of the coating solution must be within the shaded portion in the drawing.

Should the coating solution be too low in active fluoride, the impurity attack will be insufficient to produce a continuous coating on the metal surface. Should the coating solution be too high in active fluoride, i.e. above the specified maximum in the drawing, for a particular pH at which the coating bath is being operated, the attack of the zinc surface will be too vigorous and an etching effect will occur and too heavy a chromate coating will be deposited which is unsatisfactory when a paint is to be subsequently applied.

Table I is a further exemplification of the fluoride activity range, within which the coating process can be operated satisfactorily, for operating solutions at the pH indicated.

TABLE I

| pH | Fluoride Activity in Microamperes |
|---|---|
| .80 | 40–440 |
| .90 | 40–460 |
| 1.00 | 40–480 |
| 1.10 | 40–500 |
| 1.20 | 40–520 |
| 1.30 | 40–540 |
| 1.40 | 40–560 |
| 1.50 | 40–580 |
| 1.60 | 40–600 |
| 1.70 | 40–620 |
| 1.80 | 40–640 |
| 1.90 | 40–660 |
| 2.00 | 40–680 |
| 2.10 | 40–700 |
| 2.20 | 40–720 |

A complex fluoride can be employed in the process of the present invention provided that the quantity of complex fluoride present will be that amount which, upon hydrolysis, will yield or liberate sufficient active fluoride to promote the attack on the surface impurities. For example, the source for fluoride can be fluosilicic acid or fluotitanic acid, provided that the amount added will result in fluoride activity, for a given pH, within the range specified in Table I and illustrated in the drawing.

The drawback in employing a complex fluoride is that as various salts build up in an operating bath during continuous use, hydrolysis will not be sufficient to supply the necessary amounts of active fluoride. Accordingly, the preferred process of this invention utilizes the simple acid as the source of active fluoride, particularly hydrofluoric acid.

The source of strong acid in the coating solution can be nitric acid, fluosilicic acid, or acetic acid. Nitric acid and fluosilicic acid are preferred as the source for furnishing the necessary hydrogen ion to maintain the pH of the solution at its optimum level. It has been found that in order to maintain the pH of the solution, the nitric acid concentration in an operating bath should be from about 0.75 g/l to about 12.5 g/l or the fluosilicic acid concentration in an operating bath should be from about 0.40 g/l to about 10.5 g/l. Nitric acid or fluosilicic acid offers the added benefit that should salts be formed, a moderate build-up of metallic nitrate or fluosilicate in the coating bath offers no harmful effects on the coating operation.

Should fluosilicic acid be employed as the source of strong acid, the fluoride liberated through hydrolysis from the fluosilicic acid must be taken into account. The concentration of HF in the solution and the active fluoride liberated from the fluosilicic acid must be that amount which, at a specific preferred operating pH, will cause the operating bath to possess acceptable fluoride activity within the range illustrated in the drawing, as measured by a p-type silicon electrode. This will assure that at least the required active fluoride is present in the coating solution.

The improved process of this invention is normally employed after cleaning of the metal surface has been accomplished. The cleaning steps may be carried out by conventional methods which form no part of the present invention. A conventional alkaline cleaner can be employed followed by a water rinse. Should the surface be heavily soiled, a detergent cleaner additive may be employed in the cleaning step.

The treating bath can be prepared using a concentrated liquid admixture which, when added to water, will produce the operative solution with constituent concentrations and operating parameters within the preferred range.

The following examples of concentrated aqueous formulae, suitable for dilution with additional water to make a coating solution of optimum quality are presented:

FORMULA I

| | Grams |
|---|---|
| $CrO_3$ | 200 |
| HF (70% solution) | 17.6 |
| $HNO_3$ (57% solution) | 33.9 |
| Water to make 1 liter | |

FORMULA II

| | Grams |
|---|---|
| $CrO_3$ | 160 |
| HF (70% solution) | 13.8 |
| $HNO_3$ (57% solution) | 332.2 |
| Water to make 1 liter | |

FORMULA III

| | Grams |
|---|---|
| $CrO_3$ | 150 |
| HF (70% solution) | 15.1 |
| $H_2SiF_6$ (30% solution) | 188 |
| Water to make 1 liter | |

These make-up concentrated admixtures include the source of active fluoride. The coating solution is easily prepared by simply adding water to these concentrated aqueous admixtures. However, to allow for easy handling it may be desirable to add the hydrofluoric acid to the bath subsequent to the addition of the other necessary constituents rather than to include it in the concentrated admixture.

During the coating operation, depletion of the constituents in the coating bath will occur at different rates. Acid is consumed by metal attack, the active fluoride is consumed by the attack on the surface and the chromate is depleted by reduction to trivalent chromium and by inclusion in the coating. These specific losses must be replaced to maintain the bath within its optimum operating limits. The coating bath is maintained within its prescribed limits by suitable additions of a replenishing concentrate. Since the consumption of the constituents during the coating of a succession of surfaces is not in the same proportion in which these constituents exist in the bath, a replenishing concentrate must contain sufficient quantities of chromate, hydrofluoric acid, and strong acid which assure that they are restored to the desired concentration level. For proper replenishment to be accomplished, hydrofluoric acid and the strong acid are added in definite proportions as is the chromate. When nitric acid is employed in the coating process, for each part of chromic acid added to the bath, 1.8 to 3.5 parts of nitric acid, and 0.05 to 1.5 parts of hydrofluoric acid must be added to the operating bath. When fluosilicic acid is employed in the coating process, for each part of chromic acid added to the bath, 1.0 to 5.0 parts of fluosilicic acid and 0.15 to 0.50 parts of hydrofluoric acid must be added to the operating bath.

A preferred embodiment of this invention is to employ an operating solution comprising a combination of constituents consisting essentially of hydrofluoric acid, chromic acid and nitric acid. Optimum results will be attained when the concentration of these constituents in the coating solution, at the beginning of the operation as well as upon replenishment, is maintained within a specific range. The concentration of hydrofluoric acid should be maintained at about 0.4 g/l to about 0.9 g/l, the chromic acid content should be about 6 g/l to about 10 g/l, and the nitric acid should be present in an amount from 9 g/l to about 12 g/l. The pH of the resultant coating bath should be about 0.8 to about 1.5 and the measurable fluoride activity of the solution should be from about 40 microamperes to about 440 microamperes. When a coating solution is operated and maintained within these prescribed limits I have found that optimum corrosion resistance and paint adhesion will result.

In the coating operation the substrate is brought into contact with the aqueous coating solution under suitable conditions of pH, temperature, and contact time.

The time of treatment of the metal surface with the coating solution need only be long enough to insure complete wetting of the surface and can be as long as 3 minutes. Preferably, contact time between metal substrate and coating solution should range from about 1 second to about 2 minutes.

A distinct advantage of the present invention is that chromate coatings of uniform appearance and quality will be formed when different contact times, within the prescribed range are employed.

I have discovered that an operating solution employed in the process of the present invention can be applied on a zinc surface for as long as 3 minutes without forming too heavy or thick a chromate coating, which would be undesirable under a siccative finish. In certain commercial operations, such as formed parts lines, it is beneficial to have long contact time periods so that the entire workpiece receives optimum amounts of coating solution resulting in the formation of sufficient chromate coatings. The process of the present invention is particularly applicable to such commercial operations due to the long contact times which can be effected.

The process of the present invention can be effected by employing any of the contacting techniques known to the art. Contact can be effected by either roller-coating, spraying, immersion or brushing to produce the desired surface coating. Preferably, the coating solution will be applied to the metal surface by conventional spray or roller-coating methods.

The pH of the treating solution should be maintained at a level within the range of from 0.8 to 2.2. Preferably, the solution is operated at a pH of about 0.8 to about 1.5. The use of a coating solution having a pH above 2.2 is to be avoided as the coating produced will not allow for acceptable paint adhesion and therefore will not be effective in preparing the substrate for the subsequently applied siccative finish.

The coating process can be operated at temperatures from about 60° F. to about 125° F. It is preferable to operate the coating bath at ambient temperature, that is from about 60° F. to about 90° F. Generally, a slight change in the temperature will not necessitate substantial alteration of treating time, concentrations or proper pH maintenance.

Following the application of the coating solution, the coated surface can be rinsed with water or a conventional acidulated final rinse and then dried. The rinse is necessary to remove any soluble salts which have deposited on the surface and which would interfere with the subsequently applied siccative or organic finish.

In order to ensure satisfactory operation, substantially no alkali or alkaline earth cations should be deliberately included as a constituent in the coating process. I have found that the inclusion of alkali or alkaline earth metal ions appreciably increases the possibility of blistering occurring subsequent to the application of a siccative finish. The normal levels of cations found in the usual commercial water supplies may account for the presence of some undesirable alkali or alkaline earth cations. These do not have to be eliminated from the coating solution prior to use so long as they are present in an amount below 500 ppm. total.

The examples presented below are illustrative of this invention and are not considered as limiting for other materials and operating conditions falling within the scope of this invention that might be substituted.

In each example, salt spray corrosion tests (ASTM-B-117-61) were run on representative panels. These panels had been painted with an acrylic paint subsequent to the coating treatment in accordance with the present invention. The painted panels were scribed diagonally so that base metal was exposed. The panels were subjected to 5 percent salt spray and were rated in accordance with ASTM-B-1654-61 by measuring the average failure of the paint film from the scribe.

Adhesion tests were also run on the sample panels using impact test procedures which are commonly used in the testing of paints. The test surface is impacted by a falling ½-inch ball with a force measured as 60 inch-pounds, thereby deforming the test surface. Subsequent to impact, the deformed surface is inspected for loose or cracked paint, usually on the reverse side of the impact, and rated in inches of paint failure or descriptively rated.

EXAMPLE I

Galvanized panels were employed in this procedure. The panels were cleaned, rinsed with water, and then treated with an aqueous coating solution prepared so as to contain:

| | Grams/liter |
|---|---|
| $CrO_3$ | 10 |
| HF (48% solution) | 1.48 |
| $H_2SiF_6$ (35% solution) | 1.65 |

The pH of the coating bath as prepared was 1.65. The fluoride activity of the operating bath was measured with an electrolytic cell containing two electrodes, one of which was composed of p-type silicon. The voltage placed across anode and inert cathode was 1.2 volts D.C. and the p-type silicon anode had an exposed area of 0.51 in.$^2$. The fluoride activity of the operating bath was measured at 145 microamperes.

The sets of panels were sprayed at 75° F. for 15 seconds with the coating solution. The panels were rinsed in a conventional acidulated final rinse. After the application of an acrylic paint and curing at 325° F. for 30 minutes, the panels were subjected to 336 hours of salt spray (ASTM-B-117-61) and were then evaluated. Impact tests were also effected on the respective test panels and were evaluated. The impact loss was slight and salt spray results were excellent with only trace losses.

It should be noted as the coating operation continued, the quality of the coatings produced, in terms of salt spray resistance and impact loss, did not decrease as the coating bath aged.

EXAMPLE II

Galvanized panels were employed in this procedure. The panels were cleaned, rinsed with water, and then treated with coating solutions prepared so as to contain:

| | Grams/liter |
|---|---|
| $CrO_3$ | 10 |
| HF (48% solution) | 1.48 |
| $HNO_3$ (57% solution) | 1.69 |

The pH of this solution as prepared was 1.48. The fluoride activity of the operating bath was measured with an electrolytic cell containing two electrodes, one of which was composed of p-type silicon. The voltage placed across anode and inert cathode was 1.2 volts D.C. and the p-type silicon anode had an exposed area of 0.51 in.$^2$. The fluoride activity of the operating bath was measured at 110 microamperes.

The panels were sprayed at 75° F. for 15 seconds with the coating solution. Subsequent to the application of the coating solution the panels were rinsed in a conventional acidulated final rinse, then painted with an acrylic paint and cured at 325° F. for 30 minutes, and then were subjected to 336 hours of salt spray as well as impact tests. The respective panels were then evaluated. No impact loss was detected on most panels, while some showed trace losses. Salt spray results were excellent with no corrosion loss.

EXAMPLE III

Galvanized steel panels were cleaned and rinsed in water. An aqueous solution was prepared so as to contain:

| | Grams/liter |
|---|---|
| $CrO_3$ | 10 |
| HF (49% solution) | 1.18 |
| Glacial acetic acid | 5.24 |

This solution as prepared had a pH of 1.25 and was applied to the test panels using a 15 second spray application at 75° F. The fluoride activity of the operating bath was measured with an electrolytic cell containing two electrodes, one of which was composed of p-type silicon. The voltage placed across anode and inert cathode was 1.2 volts D.C. and the p-type silicon anode had an exposed area of 0.51 in.$^2$. The fluoride activity of the operating bath was measured at 140 microamperes.

The coated panels were rinsed in water and then painted with an acylic paint and cured at 325° F. for 30 minutes. After 336 hours of slat spray testing the panels were examined and found to contain only slight corrosion.

Another set of the coated and painted panels were subjected to 60 inch-pounds impact test. The impact loss was slight.

EXAMPLE IV

Galvanized steel panels were cleaned and rinsed in water. An aqueous solution was prepared so as to contain:

| | Grams/liter |
|---|---|
| $CrO_3$ | 10 |
| HF (49% solution) | 1.18 |
| $H_2SiF_6$ (35% solution) | 6.4 |

This solution as prepared had a pH of 1.10 and was applied to the test panels using a 15 second spray application at 75° F. The fluoride activity of the operating bath was measured with an electrolytic cell containing two electrodes, one of which was composed of p-type silicon. The voltage placed across anode and inert cathode was 1.2 volts D.C. and the p-type silicon anode had an exposed area of 0.51 in.$^2$. The fluoride activity of the operating bath was measured at 170 microamperes.

The coated panels were rinsed in water and then painted with an acrylic paint and cured at 325° F. for 30 minutes. After 336 hours of salt spray testing the panels were examined and found to contain only slight corrosion.

Another set of the coated and painted panels were subjected to 60 inch-pounds impact tests. The impact loss was slight.

EXAMPLE V

Galvanized panels, 4 by 6 inches, were employed in this procedure. The panels were cleaned in an alkaline cleaner for 30 seconds at 170° F. and then rinsed in tap water. The test panels were then sprayed for 30 seconds at 75° F. with an aqueous coating solution prepared so as to contain:

| | Grams/liter |
|---|---|
| $CrO_3$ | 10 |
| HF (70% solution) | 0.88 |
| $HNO_3$ (57% solution) | 1.69 |

The pH of this solution as prepared was 1.08. The fluoride activity of the operating bath was measured with an electrolytic cell containing two electrodes, one of which was composed of p-type silicon. The voltage placed across anode and inert cathode was 1.2 volts D.C. and the p-type silicon anode had an exposed area of 0.51 in.$^2$. The fluoride activity of the operating bath was measured at 140 microamperes.

The panels were subjected to a water rinse and then painted with an acrylic paint. One set of panels was subjected to 336 hours of salt spray while the other set was subjected to 60 inch-pounds impact. The observed impact test results were excellent with trace losses only. Salt spray resistance was good with slight corrosion loss.

EXAMPLE VI

Galvanized panels, 4 to 6 inches, were employed in this procedure. The panels were cleaned in an alkaline cleaner for 30 seconds at 170° F. and then rinsed in tap water. The test panels were then sprayed for 60 seconds at 75° F. with the aqueous coating solution prepared so as to contain:

| | Grams/liter |
|---|---|
| $CrO_3$ | 10 |
| HF (70% solution) | 0.88 |
| $HNO_3$ (57% solution) | 1.69 |

The pH of this solution as prepared was 1.08. The fluoride activity of the operating bath was measured with an electrolytic cell containing two electrodes, one of which was composed of p-type silicon. The voltage placed across anode and inert cathode was 1.2 volts D.C. and the p-type silicon anode had an exposed area of 0.51 in.$^2$. The fluoride activity of the operating bath was measured at 140 microamperes.

The panels were subjected to a water rinse and then painted with an acrylic paint. One set of panels was subjected to 336 hours of salt spray while the other set was subjected to 60 inch-pounds impact. The observed impact test results were excellent with trace losses only. Salt spray loss was slight.

EXAMPLE VII

Electrogalvanized steel panels, four by six inches, were cleaned in an alkaline cleaner for 30 seconds at 170° F. and rinsed in tap water. The test panels were then sprayed for 15 seconds at 70° F. with the following aqueous coating solution prepared so as to contain:

| | Grams/liter |
|---|---|
| $CrO_3$ | 10 |
| HF (70% solution) | 0.88 |
| $HNO_3$ (57% solution) | 1.69 |

The pH of this solution as prepared was 1.30. The fluoride activity of the operating bath was measured with an electrolytic cell containing two electrodes, one of which was composed of p-type silicon. The voltage placed across anode and inert cathode was 1.2 volts D.C. and the p-type silicon anode had an exposed area of 0.51 in.$^2$. The fluoride activity of the operating bath was measured at 135 microamperes.

The panels were rinsed in a conventional acidulated final rinse and then painted with an acrylic paint and cured at 325° F. for 30 minutes. One set of panels was subjected to 336 hours of salt spray while another set was subjected to 60 inch-pounds impact. The observed impact test results were excellent, with no paint loss. Salt spray resistance was excellent with only traces of corrosion observed.

I claim:

1. A process for treating a zinciferous surface comprising the application to said surface of an acidic aqueous solution consisting essentially of chromic acid in an amount from about 3 g/l to about 20 g/l (calculated as $CrO_3$), an acid selected from the group consisting of nitric acid, acetic acid, and fluosilicic acid present in an amount sufficient to adjust the pH of the resulting solution to between 0.8 and 2.2, and hydrofluoric acid in an amount sufficient to provide measurable active fluoride in the solution which, when measured with an electrolytic cell containing a p-type silicon electrode and inert platinum electrode, displays activity of from 40 microamperes to about 440 microamperes; said p-type silicon electrode having an exposed surface area of 0.51 in.$^2$ and the voltage impressed across the inert platinum electrode and the silicon electrode is 1.2 volts D.C.

2. A process for treating a zinciferous surface comprising the application to said surface of an acidic aqueous solution consisting essentially of chromic acid in an amount from about 3 g/l to about 20 g/l (calculated as $CrO_3$), nitric acid present in an amount sufficient to adjust the pH of the resulting solution to between 0.8 and 1.5, and measurable active fluoride whose activity in the solution is measured with an electrolytic cell containing a p-type silicon electrode, and displays activity of from 40 microamperes to about 440 microamperes; said p-type silicon electrode having an exposed surface area of 0.51 in.² and the voltage impressed across the inert electrode and the silicon electrode is 1.2 volts D.C.

3. A process for treating a zinciferous surface comprising the application to said surface of an acidic aqueous solution consisting essentially of chromic acid in an amount from about 3 g/l to about 20 g/l (calculated as $CrO_3$), fluosilicic acid present in an amount sufficient to adjust the pH of the resulting solution to between 0.8 and 1.5, and measurable active fluoride, whose activity in the solution is measured with an electrolytic cell containing a p-type silicon electrode and displays activity of from 40 microamperes to about 440 microamperes; said p-type silicon electrode having an exposed surface area of 0.51 in.² and the voltage impressed across the inert electrode and the silicon electrode is 1.2 volts D.C.

* * * * *